(12) United States Patent
Zhang et al.

(10) Patent No.: US 10,818,882 B2
(45) Date of Patent: Oct. 27, 2020

(54) SECONDARY BATTERY AND BATTERY MODULE

(71) Applicant: Contemporary Amperex Technology Co., Limited, Ningde, Fujian (CN)

(72) Inventors: Jie Zhang, Ningde (CN); Xiaorong Liu, Ningde (CN); Zhijun Guo, Ningde (CN); Peng Wang, Ningde (CN); Guowei Li, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

(21) Appl. No.: 16/135,137

(22) Filed: Sep. 19, 2018

(65) Prior Publication Data
US 2019/0326561 A1 Oct. 24, 2019

(30) Foreign Application Priority Data
Apr. 20, 2018 (CN) .......................... 2018 1 0361345

(51) Int. Cl.
  H01M 2/02 (2006.01)
  H01M 2/04 (2006.01)
  (Continued)

(52) U.S. Cl.
  CPC ......... H01M 2/024 (2013.01); H01M 2/0434 (2013.01); H01M 2/26 (2013.01); H01M 2/30 (2013.01)

(58) Field of Classification Search
  CPC .. H01M 2/0217; H01M 2/024; H01M 2/0404; H01M 2/0434; H01M 2/0439;
  (Continued)

(56) References Cited

U.S. PATENT DOCUMENTS 3,808,073 A * 4/1974 Navarre ................ B29C 65/527
  156/64
2009/0317708 A1* 12/2009 Brandl ................ H01M 2/0277
  429/163
(Continued)

FOREIGN PATENT DOCUMENTS

EP  3343665 A1  7/2018
WO  WO2016120584 A1  8/2016

OTHER PUBLICATIONS

The Extended European Search Report for European Application No. 18196383.6, dated Mar. 15, 2019, 8 pages.

*Primary Examiner* — Victoria H Lynch
(74) *Attorney, Agent, or Firm* — Law Offices of Liaoteng Wang

(57) ABSTRACT

The disclosure provides a secondary battery and a battery module. The secondary battery comprises: a case having an accommodation space and a first opening in communication with the accommodation space; an electrode component disposed in the accommodation space; a cover plate being installed at the first opening; wherein a connection slot is formed at a joint between the cover plate and the case, and the connection slot extends in a direction away from the accommodation space and throughout a top surface of the cover plate; and a first connection member being disposed in the connection slot, wherein the cover plate and the case are hermetically connected via the first connection member.

11 Claims, 8 Drawing Sheets

(51) Int. Cl.
*H01M 2/26* (2006.01)
*H01M 2/30* (2006.01)

(58) Field of Classification Search
CPC .... H01M 2/0473; H01M 2/08; H01M 2/1061;
H01M 2/1077; H01M 2/26; H01M 2/30
See application file for complete search history.

(56) References Cited

U.S. PATENT DOCUMENTS

| | | | |
|---|---|---|---|
| 2012/0114998 A1 | 5/2012 | Hwang | |
| 2013/0295435 A1* | 11/2013 | Vu | H01M 2/0217 |
| | | | 429/157 |
| 2014/0127551 A1* | 5/2014 | Kim | H01M 2/1077 |
| | | | 429/156 |
| 2015/0243938 A1* | 8/2015 | Kim | H01M 2/0217 |
| | | | 429/185 |

* cited by examiner

SECONDARY BATTERY AND BATTERY MODULE

CROSS-REFERENCE TO RELATED APPLICATION

This application is based upon and claims priority to Chinese Patent Application No. 201810361345.8 filed on Apr. 20, 2018, the content of which is incorporated herein by reference in its entirety.

FIELD

The present disclosure relates to the technical field of energy storage devices, in particular to a secondary battery and a battery module.

BACKGROUND

A secondary battery is a rechargeable battery, which is widely used in various fields. The commonly used secondary battery is a square hard case structure, which comprises a case, a cover plate, and an electrode component. An electrode component is placed in the case, and an opening portion of the case is closed by a cover plate, so that a closed space is provided by the cover plate and the case, to accommodate the electrode component and electrolyte. Electrical energy of the electrode component is drawn out of the closed space from the closed space through a pole mounted on the cover plate.

With the wide application of new energy sources, energy density of power batteries is becoming higher and higher. At present, in order to meet the higher energy density requirements, plastic case batteries and soft pack batteries are mainly used to replace the traditional hard case batteries. Moreover, in order to further increase the energy density, the plastic case of the plastic case battery is designed to have a very thin wall thickness, which results in that the opening portion of the plastic case may undergo large warping deformation. The existing plastic case comprises a case and a cover plate. The case and the cover plate are connected by laser welding, and the assembly requirements of the cover plate and the case are high, so a pass rate of the plastic case is low, thereby resulting in waste of materials, affecting assembly efficiency of the secondary battery, and increasing production cost of the secondary battery.

Therefore, there is a need for a new secondary battery and a new battery module.

SUMMARY

According to an embodiment of the present disclosure, a secondary battery and a battery module are provided, which can reduce manufacturing accuracy requirements of a cover plate and a case of the secondary battery. Therefore, according to an embodiment of the present disclosure, the secondary battery is simple in structure, easy to produce, and is able to effectively improve the production efficiency of the secondary battery and reduce its production cost.

According to an aspect of an embodiment of the present disclosure, a secondary battery is provided. The secondary battery comprises a case having an accommodation space and a first opening in communication with the accommodation space; an electrode component disposed in the accommodation space; a cover plate, wherein the cover plate is installed at the first opening, and a connection slot is formed at a joint between the cover plate and the case, and the connection slot extends in a direction away from the accommodation space and throughout a top surface of the cover plate; and a first connection member, wherein the first connection member is disposed in the connection slot, and the cover plate and the case are hermetically connected via the first connection member.

According to another aspect of the embodiments of the present disclosure, a method for assembling a secondary battery is also provided. The method comprises: providing a case, the case having an accommodation space and a first opening in communication with the accommodation space; providing an electrode component, and disposing the electrode component in the accommodation space; providing a cover plate, installing the cover plate at the first opening, and forming a connection slot at a joint between the cover plate and the case, wherein the connection slot extends in a direction away from the accommodation space and throughout a top surface of the cover plate; filling a first connection member into the connection slot, the first connection member is bonded with the connection slot, such that the cover plate and the case are hermetically connected via the first connection member.

According to still another aspect of the embodiments of the present disclosure, a battery module is provided. The battery module comprises a plurality of secondary batteries, wherein the plurality of secondary batteries are electrically connected to one another.

In summary, the connection slot is provided at the joint part between the cover plate and the case. The first connection member is disposed into the connection slot, to connect the cover plate with the case via the first connection member, which enables to hermetically connect the cover plate to the case even if there is a gap between the cover plate and the case. As a result, a lower machining accuracy is required for the cover plate and the case. The cover plate can be hermetically connected with the case without a need for totally the same size of the cover plate and the case at the joint portion. Therefore, the secondary battery and the battery module of the embodiments of the present disclosure are simple in structure and simplify in assembly, thereby improving the processing efficiency of the secondary battery and the battery module and lowering the production cost.

BRIEF DESCRIPTION OF THE DRAWINGS

The present disclosure may be better understood from the following description of specific embodiments of the disclosure in conjunction with the accompanying drawings, wherein: other features, objects, and advantages of the disclosure will become apparent from the following detailed description of non-limiting embodiments with reference to the drawings, in which the same or like reference numerals represent the same or similar features.

DESCRIPTION OF REFERENCE NUMERALS

Figure 1:
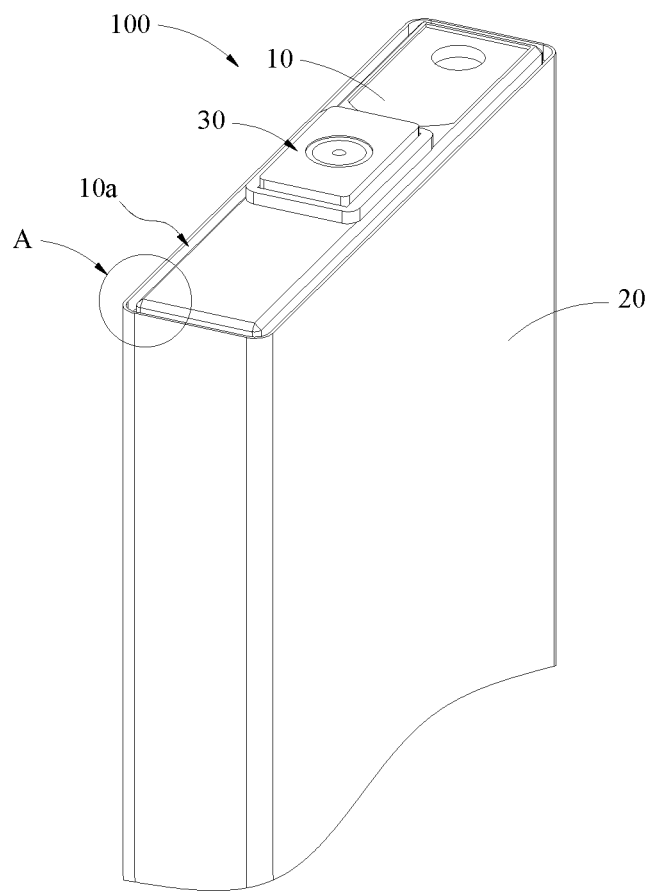
FIG. 1 is a schematic structural view of a state of a secondary battery according to an embodiment of the present disclosure.

1—battery module; 100—secondary battery; 110—accommodation space;
10—cover plate; 10a—connection slot; 11—base portion; 12—extending portion; 13—bulge portion;
20—case; 20a—connection flange;
30—terminal component; 31—terminal; 311—electrical connection plate; 312—pole;
40—first connection member;
50—second connection member; 51—body portion; 52—first engaging portion; 53—second engaging portion.

DETAILED DESCRIPTION

Features and exemplary embodiments of various aspects of the disclosure are described in detail below. In the following detailed description, numerous specific details are set forth in order to provide thorough understanding of the present disclosure. However, it will be apparent to those skilled in the art that the present disclosure may be practiced without some of these specific details. The following description of the embodiments is merely intended to provide better understanding of the present disclosure by illustrating examples of the present disclosure. In the drawings and the following description, at least some well-known structures and techniques have not been shown in order to avoid unnecessarily obscuring the present disclosure; and, for the sake of clarity, the dimensions of partial structures may be exaggerated. The same reference numerals in the drawings denote the same or similar structures, and thus their detailed description will be omitted. Additionally, the features, structures, or characteristics described hereinafter may be combined in any suitable manner in one or more embodiments.

The orientation words appearing in the following description are the directions shown in the drawings, and do not limit the specific structure of the secondary battery of the present disclosure. In the description of the present disclosure, it should also be noted that, unless specifically defined or limited, the terms "installed", "connected", and "connecting" should be interpreted broadly, for example, they may be fixed connections or they may be detachable or integral connection; either directly or indirectly. Those of ordinary skill in the art may understand the specific meanings of the above terms in the present disclosure as the case may be.

A secondary battery provided by an embodiment of the present disclosure may perform charge and discharge operations cyclically to facilitate repeated use of the secondary battery. Further, the secondary battery in the embodiment of the present disclosure is capable of reducing manufacturing accuracy requirements of the cover plate and the case by disposing a connection member between the cover plate and the case, in which the connection member is capable of being filled in a molten state. Therefore, the secondary battery of the embodiment of the present disclosure has a simple structure and is easy to produce, and thus may effectively improve the production efficiency of the secondary battery and reduce its production cost.

For better understanding of the present disclosure, a secondary battery and a battery module according to embodiments of the present disclosure will be described in detail with reference to FIG. 1 to FIG. 14.

FIG. 1 is a schematic structural view of a state of a secondary battery 100 according to an embodiment of the present disclosure. As shown in FIG. 1, the secondary battery 100 generally comprises a cover plate, a case 20, and an electrode component inside the case 20. It should be noted that, in the following description of the embodiments, terms such as "top", "upper", etc. describing orientation are all the directions shown with reference to the placement position in the drawings.

According to an embodiment of the present disclosure, the case 20 may be made of a plastic material such as PE or PP. The case 20 is formed in a rectangular box shape, that is, the case 20 has an accommodating space 110 therein and has a first opening to communicate with the accommodating space 110 through the first opening. In addition, a waterproof layer (for example, aluminum layer) may also be provided outside the case 20. According to another embodiment of the present disclosure, the case 20 may be made of other materials, such as aluminum alloy, steel, or carbon fiber reinforced composite.

The electrode component may form a body by stacking or winding a first electrode plate, a second electrode plate and a separator together, wherein the separator is an insulator interposed between the first electrode plate and the second electrode plate. In the present embodiment, as an exemplary example, the first electrode plate is a positive electrode plate and the second electrode plate is a negative electrode plate. Likewise, in other embodiments, the first electrode plate may also be a negative electrode plate and the second electrode plate may be a positive electrode plate. In addition, active material of the positive electrode plate is coated on a coating area of the positive electrode plate, and active material of the negative electrode plate is coated on a coating area of the negative electrode plate. An uncoated area extending from the coated area of the body serves as a tab, and the electrode component comprises two tabs, namely a positive tab and a negative tab. The positive tab is extended from the coating area of the positive electrode plate; the negative tab is extended from the coating area of the negative electrode plate.

The cover plate is used to seal the case 20, and the electrode component may be sealed in the case 20 by connecting the cover plate with the first opening of the case 20. The secondary battery 100 may comprise two cover plates that are respectively located at upper and lower sides of the secondary battery 100. One of a terminal component of the positive electrode and a terminal component of the negative electrode, that are used for leading electric energy of the electrode component to the outside of the secondary battery 100, is mounted on the cover plate at the top of the secondary battery 100; and the other one of the terminal component of the positive electrode and the terminal component of the negative electrode is mounted on the cover plate at the bottom of the secondary battery 100. Of course, in some variant embodiments, the two terminal components of the secondary battery 100 may be both disposed on the cover plate 10 on the same side of the case 20, that is, only one cover plate is provided.

Since the two cover plates mounted on both sides of the secondary battery 100 are of completely the same structure, the structure of the cover plate will be described below by taking only the cover plate mounted on the upper side of the secondary battery 100 as an example. Of course, in other alternative embodiments, the structure of the cover plates respectively mounted on the upper and lower sides of the secondary battery may also be configured differently according to the existing technique.

Figure 2:
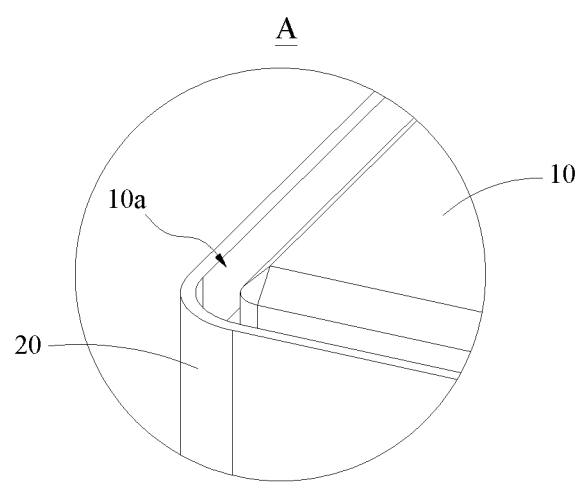
FIG. 2 is an enlarged schematic view of a partial structure of a part A of the secondary battery of FIG. 1.
Figure 3:
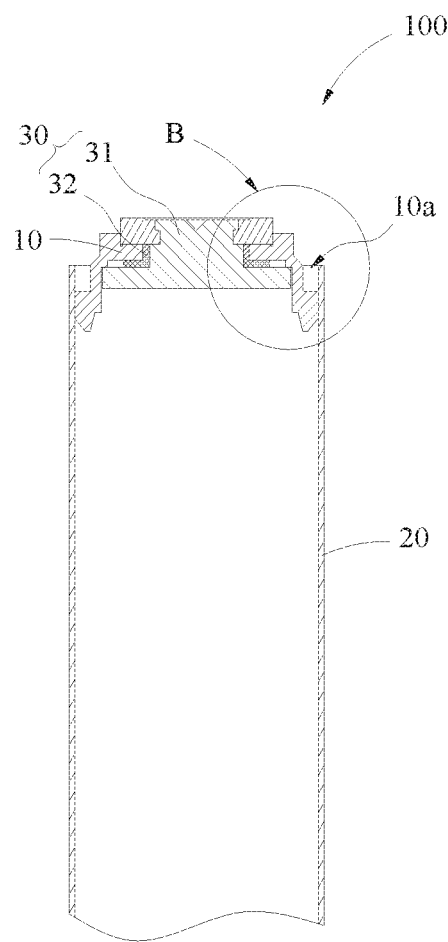
FIG. 3 is a schematic structural cross-sectional view of the secondary battery of FIG. 1 taken along a longitudinal direction.
Figure 4:
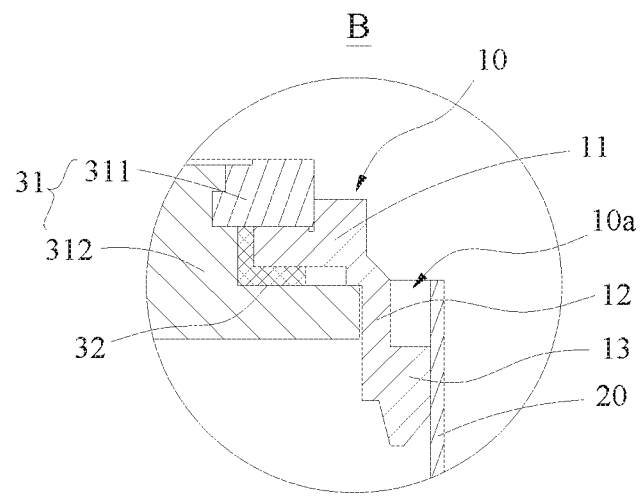
FIG. 4 is an enlarged schematic view of a partial structure of a part B of the secondary battery of FIG. 3.

FIG. 2 is an enlarged schematic view of a part A of the secondary battery 100 of FIG. 1; FIG. 3 is a schematic sectional structure of the secondary battery 100 of FIG. 1 taken along a longitudinal direction; FIG. 4 is an enlarged schematic view of a part B of the secondary battery of FIG. 3. As shown from FIG. 1 to FIG. 4, the cover plate generally comprises a cover plate 10 and a terminal component 30 disposed on the cover plate 10, and electrical connection between the positive electrode plate (or the negative electrode plate) and an external electrical component is achieved by the terminal component 30.

The material of the cover plate 10 is insulating plastic, and the cover plate 10 may be made of a high-temperature resistant insulating plastic material. For example, the cover plate may be made of one or more of polyethylene, polyphenylene sulfide, perfluoro alkoxy resin, and polypropylene. Moreover, the cover plate 10 has a size and shape that matches with the first opening of the case 20, so that the cover plate 10 is able to be connected at the first opening of the case 20. In addition, according to a variant embodiment of the present disclosure, the cover plate 10 may be embedded with metal therein. According to another embodiment of the present disclosure, the cover plate 10 may be made of other materials, such as aluminum alloy, steel, or carbon fiber reinforced composite.

According to a specific example of the present disclosure, the terminal component 30 comprises an electrode terminal 31 and a seal 32. In order to mount the terminal component 30, an electrode lead-out hole is provided on the cover plate 10. When the cover plate 10 is a plastic material, the electrode terminal 31 may be in direct contact with the cover plate 10. In one specific example, the electrode terminal 31 is an electrode terminal of a positive electrode (of course, the electrode terminal 31 may also be an electrode terminal of a negative electrode), which may be made of aluminum or aluminum alloy. According to an embodiment of the present disclosure, the electrode terminal 31 generally comprises three parts: an external wiring part for achieving electrical connection with an electrical element outside the secondary battery 100 (such as a busbar), a connection part for achieving fixed connection with the cover plate 10, and an internal wiring part for achieving electrical connection with the tab of the electrode component in the case 20 within the secondary battery 100.

In the present embodiment, specifically, the electrode terminal 31 comprises an electrical connection plate 311 and a pole 312. The electrical connection plate 311 is located on a lateral side of the cover plate 10. The pole 312 comprises a pole body that serves as a connection portion for fixedly connecting with the cover plate 10, and a current collector portion of the internal wiring part for an electrical connection with the first tab. The electrical connecting plate 311 serves as an external wiring part connected to the busbar; the current collector portion penetrates the terminal lead-out hole and has across section area larger than that of the pole body.

The electrical connection plate 311 is provided with a through hole at a substantially central position, and the diameter of the through hole is adapted to the diameter of the pole body of the pole. When the electrode terminal 31 is mounted on the cover plate 10, the electrical connection plate 311 needs to be fixed on the side of the cover plate 10 away from the inside of the secondary battery 100. The pole body of the pole 312 protrudes toward the outside of the secondary battery 100 through the electrode lead-out hole from the side of the cover plate 10 facing the case 20. The current collector portion may abut against the side of the cover plate 10 facing the case 20, so as to limit the pole 312. The pole body protrudes from the cover plate 10, and further protrudes into the through hole of the electrical connection plate 311, to rivet and connect the pole 312 with the electrical connection plate 311, so as to fix the electrode terminal 31 to the cover plate 10.

In addition, in order to ensure tightness of the electrode lead-out hole, the seal 32 is disposed between the pole 312 and the cover plate 10. The seal 32 comprises an axially extending part and a radially extending portion, the axially extending portion is interposed between the cover plate 10 and the pole body, and the radially extending portion is interposed between the cover plate 10 and the extending portion. In this way, the sealing member 32 is in close contact with the cover plate 10 and the pole 312, respectively, so that airtightness of the secondary battery 100 may be ensured.

Of course, embodiments of the present disclosure do not define the specific structure of the terminal component 30. In other alternative embodiments, the terminal component 30 may be in other forms, as long as electrical connection between the electrode component inside the case 20 and the electrical component outside the case 20 is achieved.

Figure 5:
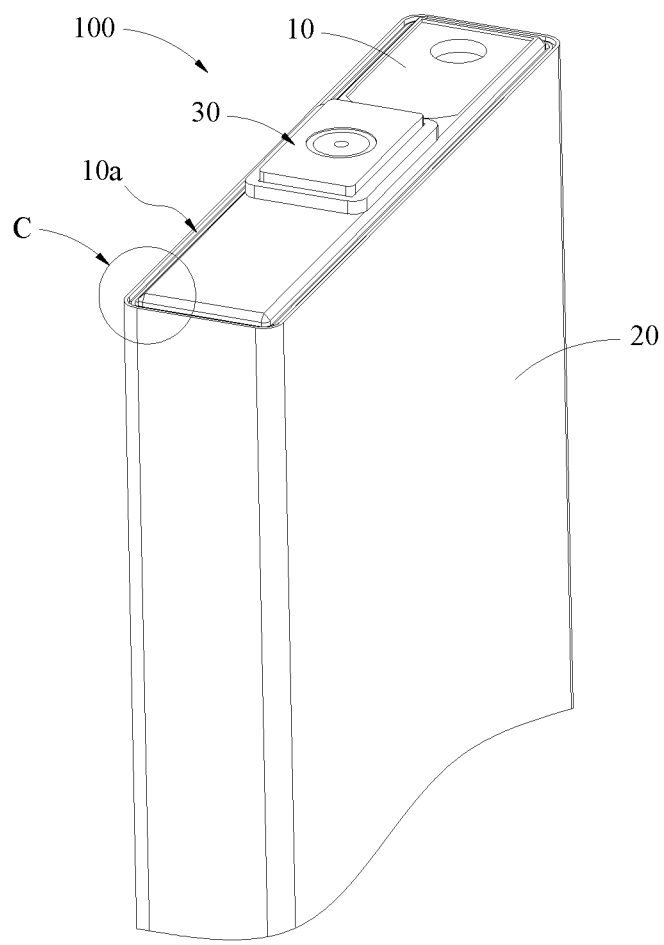
FIG. 5 is a schematic structural view of another state of the secondary battery of FIG. 1.
Figure 6:
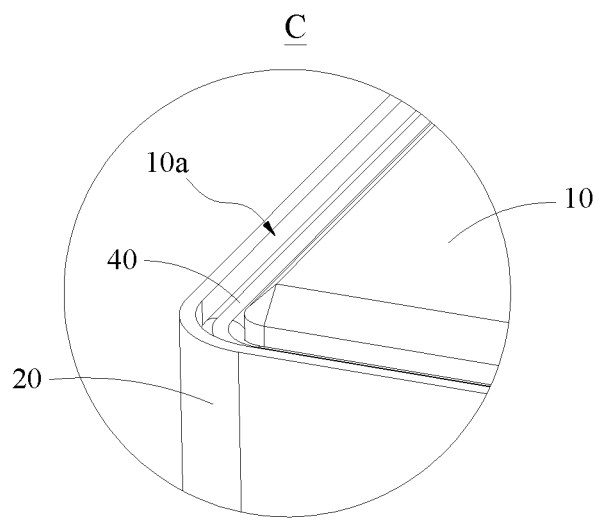
FIG. 6 is an enlarged schematic view of a partial structure of a part C of the secondary battery of FIG. 5.
Figure 7:
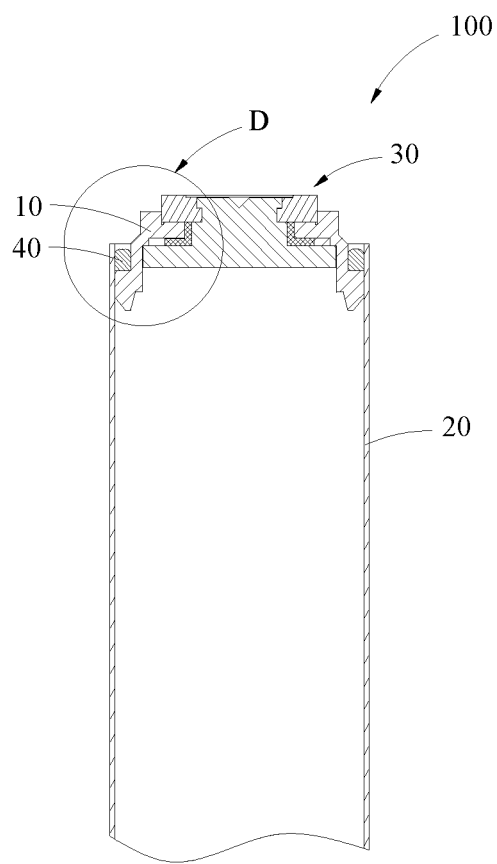
FIG. 7 is a schematic structural cross-sectional view of the secondary battery of FIG. 5 taken along a longitudinal direction.
Figure 8:
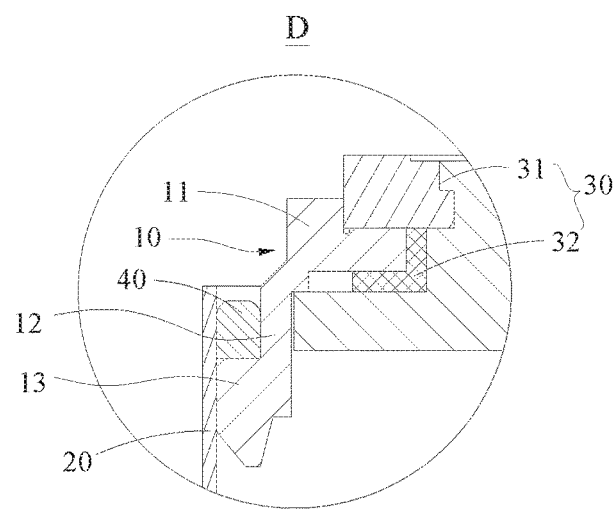
FIG. 8 is an enlarged schematic view of a partial structure of a part D of the secondary battery of FIG. 7.

FIG. 5 is a schematic structural view of another state of the secondary battery 100 of FIG. 1; FIG. 6 is an enlarged schematic view of a part C of the secondary battery 100 of FIG. 5; FIG. 7 is a schematic structural cross-sectional view of the secondary battery of FIG. 5 taken along a longitudinal direction; and FIG. 8 is an enlarged schematic view of a part D of the secondary battery of FIG. 7. As shown from FIG. 1 to FIG. 8, according to a specific example of the present disclosure, the connection between the cover plate 10 and the case 20 of the secondary battery 100 is achieved by using a plastic melting connection manner. In order to achieve a sealed connection between the cover plate 10 and the case 20, a connection slot 10a is formed at a junction of the cover plate 10 and the case 20. The connection slot 10a extends in a direction away from the accommodation space 110 of the case 20 and throughout the top surface of the cover plate 10, that is, the connection slot 10a forms a mouth-shape on a side away from the accommodation space 110.

According to an exemplary embodiment of the present disclosure, at least a portion of the cover plate 10 protrudes into the first opening of the case 20, and the connection slot 10a is formed between the portion of the cover plate 10 protruding into the first opening and an inner wall of the case 20. Exemplarily, in the present embodiment, the cover plate 10 comprises: a base portion 11, an extending portion 12 and a bulge portion 13. Since the first opening of the case 20 needs to be closed by the cover plate 10, the base portion 11 of the cover plate 10 has a thin plate shape and is adapted to the first opening shape of the case 20. The extending portion 12 is a flange extending toward the inner of the case 20. In the present embodiment, the extending portion 12 is annular and is disposed circumferentially and continuously on the periphery of the side of base portion 11 facing the case 20, and protrudes away from the electrical connection plate 311. That is, the extending portion 12 is a closed ring. The bulge portion 13 is also annular. The bulge portion 13 is provided at the end of the extension 12 away from the base part 11, and the bulge portion 13 is also continuously and circumferentially connected to the end of the extending portion 12. That is, the bulge portion is also a closed ring.

According to an alternative embodiment of the present disclosure, the base portion 11, the extending portion 12 and the bulge portion 13 are formed integrally, so that the cover plate 10 may ensure a higher structural strength. Of course, embodiments of the present disclosure do not limit the thickness of the extending portion 12 and the bulge portion 13, as long as the thicknesses of the extending portion 12 and the bulge portion 13 do not affect the arrangement of the internal structure of the secondary battery 100.

When the cover plate 10 is connected with the case 20, the bulge portion 13 of the cover plate 10 fully extends into the first opening of the case 20, and at least part of the extending portion 12 is located into the first opening of the case 20, so that the connection slot 10a is formed by the outer peripheral wall of the extending portion 12, the top surface of the bulge portion 13, and the inner wall of the case 20. That is, in the present embodiment, the connection slot 10a formed at the joint portion of the cover plate 10 and the case 20 is a continuous ring, and the connection slot 10a surrounds the outer periphery of the base portion 11.

According to an embodiment of the present disclosure, a first connection member 40 is provided in the connection slot 10a, and the first connection member 40 is of plastic material. The cover plate 10 and the case 20 are sealed and connected by the first connection member 40. Of course, the specific material of the first connection member 40 may be the same as or different from the cover plate 10 and the case 20. Exemplarily, the first connection member 40 may be made of thermoplastic plastic. As an example, the first connection member 40 may be made of one or more of perfluoro alkoxy resin, polyamide chloride, polyethylene, and polypropylene. According to another embodiment of the present disclosure, the first connection member 40 may be made of other materials, such as aluminum alloy, steel, or carbon fiber reinforced composite.

According to an embodiment of the present disclosure, when connecting the cover plate 10 with the case 20 by the first connection member 40, molten thermoplastic plastic may be injected into the connection slot 10a, so that the outer wall surface of the extending portion 12, the top surface of the bulge portion 13 and the inner wall surface of the case 20 are bonded via the hot melted thermoplastic plastic. After the thermoplastic plastic is cooled in the connection slot 10a, the first connection member 40 is formed. At this time, the first connection member 40 is fully bonded with the connection slot 10a, so that the cover plate 10 and the case 20 may be firmly connected and sealed. Since the connection slot 10a is a complete annular slot as described in the above embodiment, the first connection member 40 is also a complete ring structure.

As to existing secondary batteries, when a cover plate and a case are connected by laser welding, a perimeter of an inner wall of the case is required to be equal to a perimeter of an outer wall of the cover plate at a joint between the cover plate and the case. However, if the perimeter of the inner wall of the case is greater than the perimeter of the outer wall of the cover plate, wrinkles may occur at a welded portion of the case, which may easily cause poor sealing of the secondary battery. In addition, high machining accuracy of the secondary battery is required to equal the perimeter of the inner wall of the case with the perimeter of the outer peripheral wall of the cover plate. Besides, even if a size of the outer wall of the cover plate is equal to that of the inner wall of the case, due to that buckling deformation of the case may occur, the cover plate and the case are easily interfered with each other, thereby causing assembling difficulty of the cover plate into the case.

According to the embodiment of the present disclosure, in the secondary battery 100, the connection between the cover plate 10 and the case 20 is achieved by means of fusion connection by the first connection member 40, and low matching accuracy between the cover plate 10 and the case 20 is required. The bulge portion 13 of the cover plate 10 may fit with the inner wall of the case 20, or there may be a certain gap between the outer wall of the bulge portion 13 and the inner wall of the case 20 before assembly, for example, there may be a gap of 0-1 mm therebetween. Because of surface tension of the molten thermoplastic plastic, the molten thermoplastic plastic would not pass through the gas and damage the electrode component as long as the gap is less than 1 mm. The first connection member 40 may firmly connect the cover plate 10 with the case 20 during cooling process, to seal the case 20 with the cover plate 10. The machining accuracy of the cover plate 10 and the case 20 would not affect the connection between the cover plate 10 and the case 20. Therefore, the secondary battery 100 according to the embodiment of the present disclosure may reduce the requirement of the machining accuracy of the cover plate 10 and the case 20, while ensuring air tightness between the cover plate 10 and the case 20, which helps to effectively lower the cost, reduce the assembly difficulty, and improve the assembly efficiency of the secondary battery 100.

According to an alternative embodiment of the present disclosure, the first connection member 40 engaged in the connection slots 10a has a height not exceed a top surface of the case 20. This arrangement is beneficial to avoid overfilling of the thermoplastic plastic in the connection slot 10a in the early stage. Actually, overfilled thermoplastic plastic may cause the plastic to overflow out of the connection slots 10a, thereby resulting in waste of the plastic and affecting the overall appearance of the secondary battery 100. In addition, this arrangement may also prevent the first connection member 40 from being exposed out of the connection slots 10a, that is, protruding from the outer wall of the case 20 and being pressed by other external structures to affect connection stability between the cover plate 10 and the case 20.

According to an alternative embodiment of the present disclosure, the extending portion 12 (i.e., the length of the extending portion 12 extending longitudinally of the secondary battery 100) has a height not exceed the portion of the case 20 that forms the connection slot 10a. That is, the height of the extending portion 12 is less than or equal to the height of the case 20 exposed above the top surface of the bulge portion 13. In this way, after the cover plate 10 and the case 20 are connected by the first connection member 40, this arrangement prevents a deformation of the portion of the extending portion 12 that is higher than the case 20 to squeeze the first connection member 40 formed in the connection slot 10a, and further to affect the stability of the connection between the cover plate 10 and the case 20. In addition, since the height of the extending portion 12 is not higher than that of the portion of the case 20 forming the connection slot 10a, after the molten thermoplastic plastic is filled into the connection slot 10a, a bonded area of the first connection member 40 with the cover plate 10 and the case 20 is relative large, which avoids unstable connection and easy disconnection between the cover plate 10 and the first connection member 40 due to a relative small bonded surface of the cover plate 10 with the first connection member 40.

In the above embodiments, both the extending portion 12 and the bulge portion 13 are annular and continuously surround the outer periphery of the base portion 11, but embodiments of the present disclosure are not limited thereto. In other alternative embodiments, the extending portion 12 and the bulge portion 13 may not be an enclosed annular structure, but discontinuously surround the outer periphery of the base portion 11. Under such circumstance, the bulge portion 13 may also be set as not completely fit the inner wall of the case 20, that is, a gap of a predetermined size is formed between the bulge portion 13 and the inner wall of the case 20. The parts where the extending portion 12 and the bulge portion 13 are not provided may also be connected with the case 20 by existing welding methods. In this way, the dimensional accuracy requirements for matching between the cover plate 10 and the case 20 may also be reduced, and the problem of mismatch between the cover plate 10 and the cover plate 10 after the warping deformation of the case 20 may be avoided.

In addition, in other alternative embodiments, the cover plate 10 may completely extend into the first opening of the case 20, to form the connection slot 10a between the outer peripheral wall of the cover plate 10 and the inner wall of the case 20. Specifically, the cover plate 10 may not be provided with the extending portion 12, that is, the bulge portion 13 may be directly disposed on the outer periphery of the base portion 11. Under such circumstance, the base portion 11 may protrude into the first opening of the case 20, thereby the connection slot 10a is formed by the base portion 11, the bulge portion 13 and the inner wall of the case 20. In this way, the connection slot 10a may be achieved between the cover plate 10 and the case 20. In addition, in other alternative embodiments, the bulge portion 13 may also be provided on the inner wall surface of the case 20. That is, the bulge portion 13 may be integrally disposed on the inner wall surface of the case 20 and the bulge portion 13 may extend towards the accommodation space 110 of the case 20. In other words, the bulge portion 13 is a part of the case 20. Under such circumstance, the connection slot 10a may be similarly formed by the outer wall surface of the base portion 11, the top surface of the bulge portion 13, and the inner wall surface of the case 20.

Based on the structures of the secondary battery 100 in the above embodiments, the present disclosure further provides a method for assembling a secondary battery, for connecting the cover plate 10 and the case 20 to each other by the first connection member 40. According to a specific embodiment of the present disclosure, a method for assembling a secondary battery specifically comprises the following steps.

Firstly, a case 20 made of plastic material is provided. An accommodation space 110 is provided in the case 20, and moreover, a first opening is provided at each of two ends of the case 20 so that the first opening communicates with the accommodation space 110. Of course, in other embodiments, in the case that the terminal component of the positive electrode and the terminal component of the negative electrode are both disposed on the same side of the secondary battery 100, only one first opening of the case 20 is required.

Then, the electrode component is placed in the accommodation space 110 of the case 20.

Next, a cover plate 10 of plastic material is provided. The cover plate 10 is installed at the first opening of the case 20, and a connection slot 10a is provided at the joint of the cover plate 10 and the case 20. The connection slot 10a extends in a direction away from the accommodation space 100 and throughout a top surface of the cover plate 10. Since the manner in which the connection slot 10a is specifically provided has already been described in the above embodiments, it will not be described repeatedly.

Finally, the connection member 10a is filled with a first connection member made of a plastic material. Preferably, the molten thermoplastic plastic is filled into the connection slot 10a, and forms the first connection member 40 in the connection slot 10a after the thermoplastic plastic cools down. The first connection member 40 is engaged with the cover plate 10 and the case 20 respectively, so as to achieve a sealing connection between the cover plate 10 and the case 20. In addition, since the manner in which the cover plate 10 is specifically provided has already been described in the above embodiments, it will not be described repeatedly. A skilled person may further understand that one or more steps or methods for assembling the secondary battery 100 may be comprised in the present disclosure based on any specific structure of the secondary battery 100 in the above embodiments, and thus it will not be described repeatedly.

Figure 9:
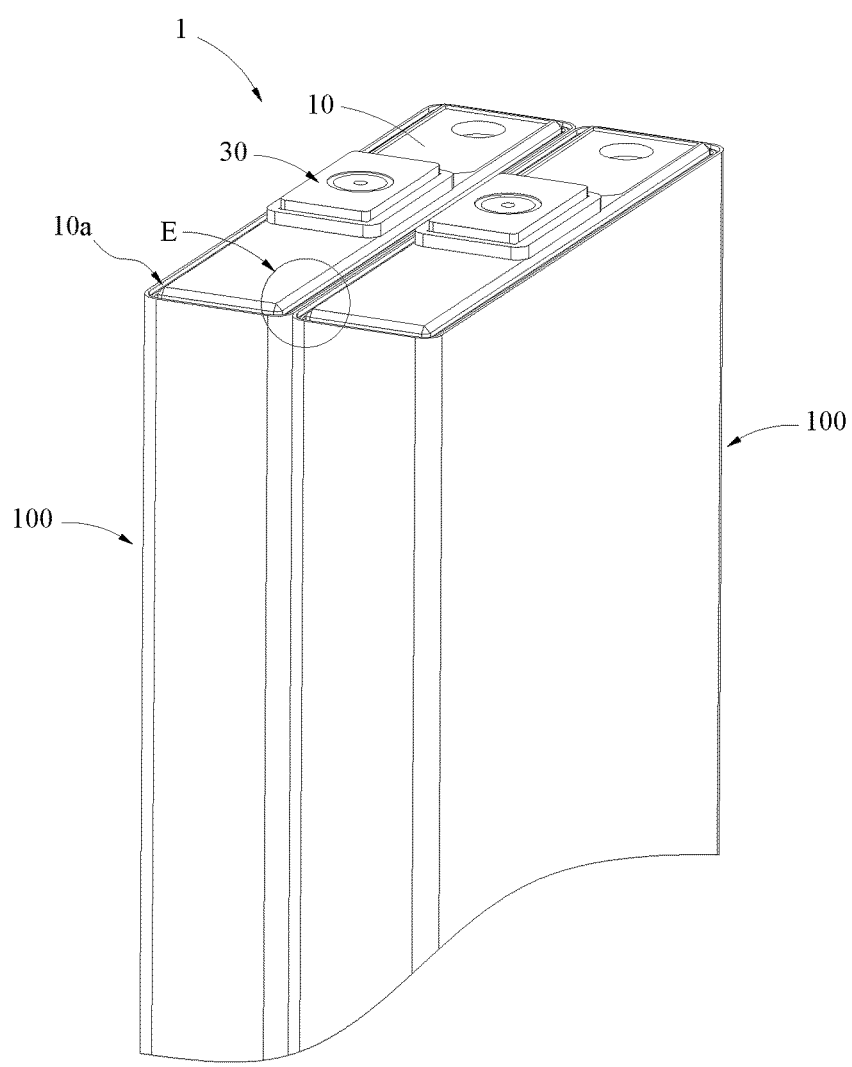
FIG. 9 is a schematic partial structural view of a state of a battery module according to an embodiment of the present disclosure.
Figure 10:
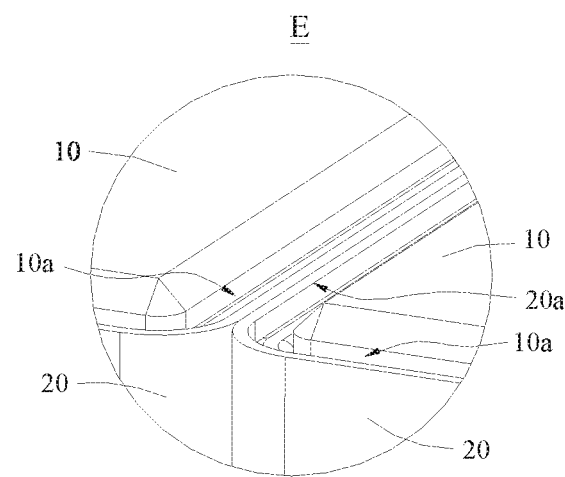
FIG. 10 is an enlarged schematic view of a partial structure of a part E of the battery module of FIG. 9.
Figure 11:
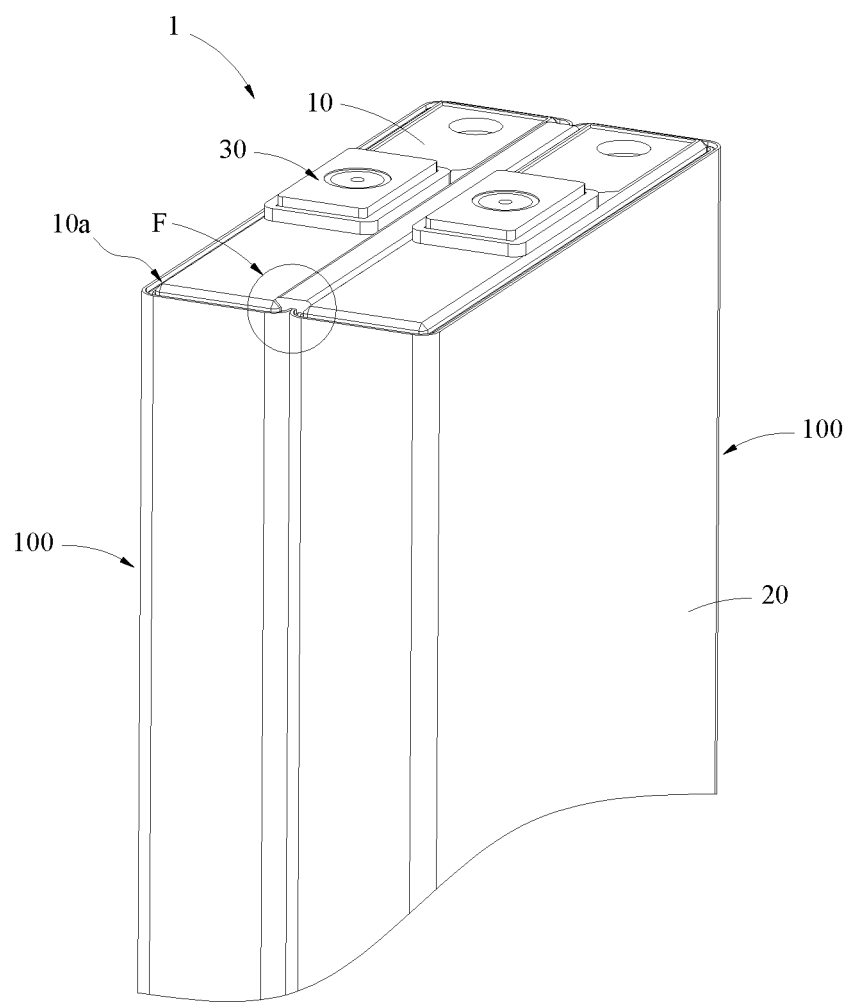
FIG. 11 is a partial schematic structural view of another state of the battery module of FIG. 9.
Figure 12:
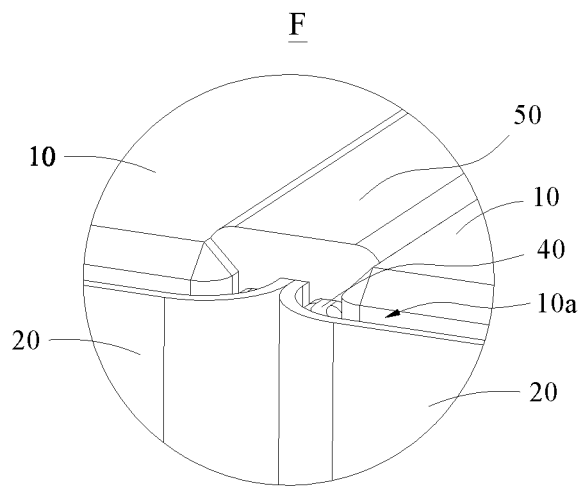
FIG. 12 is an enlarged schematic view of a partial structure of a part F of the battery module of FIG. 11.
Figure 13:
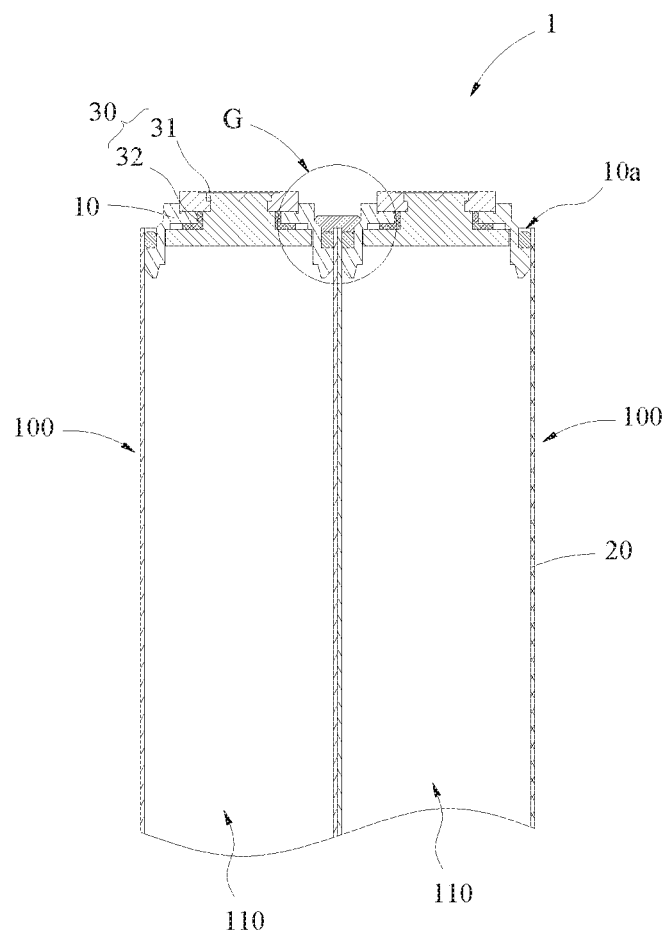
FIG. 13 is a schematic cross-sectional view of the battery module of FIG. 9 taken along a longitudinal direction.
Figure 14:
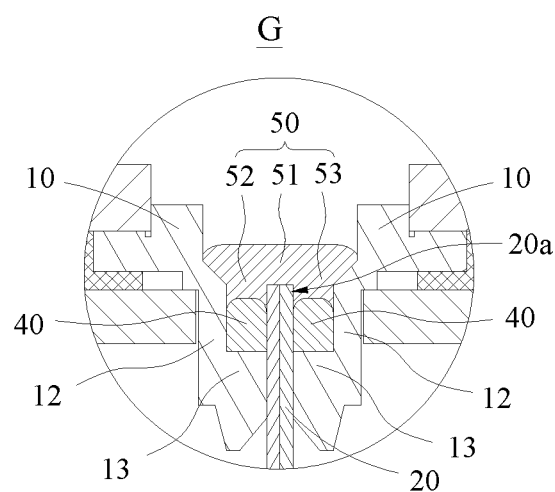
FIG. 14 is an enlarged schematic view of a partial structure of a part G of the battery module of FIG. 13.

FIG. 9 is a schematic partial structural view of a state of a battery module according to an embodiment of the present disclosure; FIG. 10 is an enlarged schematic view of a part E in the battery module of FIG. 9; FIG. 11 is a partial schematic structural view of another state of the battery module of FIG. 9; FIG. 12 is an enlarged schematic view of a part F in the battery module of FIG. 11; and FIG. 13 is a schematic cross-sectional view of the battery module of FIG. 9 taken along a longitudinal direction. As shown from FIG. 9 to FIG. 14, according to another embodiment of the present disclosure, a battery module 1 is further provided. The battery module 1 comprises a plurality of secondary batteries 100 described in the above embodiments, that is, comprises a plurality of battery cells. Every two adjacent secondary batteries 100 in the plurality of battery cells are connected one another by a second connection member 50.

Specifically, according to an embodiment of the present disclosure, the battery module 1 generally comprises a module cover, a module box, and a plurality of secondary batteries 100. The module cover is connected to the module box. The plurality of secondary batteries 100 are provided in the module box and are electrically connected one another.

According to an exemplary embodiment of the present disclosure, the module box may be made of a metal material such as aluminum, an aluminum alloy, or steel. Since the structure of the battery module 1 in the embodiment of the present disclosure is substantially the same as the structure of the battery module 1 in the existing technology, the overall structure of the battery module 1 is not specifically shown in the drawings.

The plurality of secondary batteries 100 are arranged in a stacked manner to constitute a battery cell assembly. FIGS. 9 to 14 show only two secondary batteries 100 by way of example. In other embodiments, the battery modules 1 may have more secondary batteries 100. The plurality of secondary batteries 100 are connected in series or in parallel through a busbar, and finally two output terminals of opposite-polarity are formed. The two output terminals of opposite-polarity are respectively used as a positive output terminal and a negative output terminal of the battery cell assembly, so that electric energy of the battery cell assembly may be led out by connecting the positive output terminal and the negative output terminal to the external electrical element correspondingly.

According to a specific example of the present disclosure, two adjacent secondary batteries 100 are attached to each other. Further, for each secondary battery 100, as described in the above embodiment, the height of the first connection member 40 does not exceed the height of top of the case 20. Thus, a connection flange 20a may be formed at the top edges of the cases 20 of the two adjacent secondary batteries 100 that are attached to each other. Since the connection slots 10a respectively located at both sides of the connection flange 20a are not fully filled by the respective connection member 40, there are still two connection slots adjacent to each other formed above the first connection member 40.

The material of the second connection member 50 is also a thermoplastic plastic, that is, the molten thermoplastic plastic is filled between two adjacent secondary batteries 100 in the extending direction of the connection flange 20a, that is, the thermoplastic plastic is filled at the junction of the two secondary batteries 100. In this case, some thermoplastic plastic may enter into the connection slot 10a of each secondary battery 100, and some thermoplastic plastic may be above the connection flange 20a.

Thus, the second connection member 50 is formed after the thermoplastic plastic is cooled down, and comprises three parts, i.e., a body portion 51, a first engaging portion 52 and a second engaging portion 53. The body portion 51 transitionally connects the first engaging portion 52 with the second engaging portions 53. That is, the body portion 51 of the second connection member 50 is bonded with the connection flange 20a, the first engaging portion 52 and the second engaging portion 53 respectively protrude into the connection slot 10a of the corresponding secondary battery 100, and are bonded with the connection slots 10a respectively. Of course, the first engaging portion 52 and the second engaging portion 53 may also bonded with the first connection members 40 in the corresponding connection slots 10a, respectively.

Therefore, a connection between every two secondary batteries 100 may be realized by the second connection member 50, which may not only simplify the connection operation for every two adjacent secondary batteries 100, but also enable the two adjacent secondary batteries 100 to be fixedly connected, thereby improving the structural stability of the battery module 1. This avoids that the secondary battery 100 cannot be firmly fixed by using an existing connection method to connect the two adjacent secondary batteries 100, and avoids bad effect on the stability of the overall structure of the battery module 1.

The present disclosure may be embodied in other specific forms without departing from its essential characteristics. As such, the present embodiments shall be considered in all aspects as illustrative and non-limiting, and the scope of the disclosure shall defined by the appended claims, rather than the foregoing description. Besides, all changes that fall within the meanings of the claims and equivalents thereof shall be included within the scope of the disclosure. Furthermore, different technical features shown in different embodiments may be combined to achieve beneficial effects. Those skilled in the art shall understand and implement other varied embodiments of the disclosed embodiments based on the drawings, the description, and the claims.

The invention claimed is:

1. A secondary battery, comprising:
a case having an accommodation space and a first opening in communication with the accommodation space;
an electrode component disposed in the accommodation space;
a cover plate being installed at the first opening, wherein a connection slot is formed at a joint between the cover plate and the case, and the connection slot extends in a direction away from the accommodation space and throughout a top surface of the cover plate; and
a first connection member, being disposed in the connection slot, wherein the cover plate and the case are hermetically connected via the first connection member,
wherein the case, the cover plate and the first connection member are all made of plastic,
wherein the first connection member is formed by filling molten thermoplastic plastic into the connection slot and cooling the filled thermoplastic plastic to form the first connection member,
wherein at least a part of the cover plate extends into the first opening; and the connection slot is formed by the part of the cover plate extending into the first opening and an inner wall of the case.

2. The secondary battery according to claim 1, wherein the cover plate comprises a base portion and a bulge portion, the bulge portion is connected to a periphery of the base portion and extends toward the case, the bulge portion is located in the first opening.

3. The secondary battery according to claim 2, wherein the connection slot is formed by an outer wall of the base portion, a top surface of the bulge portion and the inner wall of the case.

4. The secondary battery according to claim 3, wherein the cover plate further comprises an extending portion that is at least partially located in the first opening, the extending portion is connected to the periphery of the base portion and extends toward the accommodation space.

5. The secondary battery according to claim 4, wherein the bulge portion is connected to an end of the extending portion facing the accommodation space, and the connection slot is formed by the outer wall of the base portion, the top surface of the bulge portion and the inner wall of the case.

6. The secondary battery according to claim 4, wherein the extending portion has a height not exceed a portion of the case that forms the connection slot.

7. The secondary battery according to claim 2, wherein the connection slot and the first connection member encircle the periphery of the base portion.

8. The secondary battery according to claim 1, wherein a top surface of the first connection member is not above a top surface of the case.

9. A battery module, comprising a plurality of secondary batteries according to claim 1, wherein the plurality of secondary batteries are electrically connected to one another.

10. The battery module according to claim 9, wherein a top surface of the first connection member is lower than a top surface of the case; every two adjacent secondary batteries of the plurality of secondary batteries are attached to each other; and
a connection flange is formed by cases of the two adjacent secondary batteries that are attached to each other.

11. The battery module according to claim 10, wherein the battery module further comprises a second connection member; the second connection member comprises a body portion, a first engaging portion and a second engaging portion that are connected; the body portion is bonded with the connection flange; the first engaging portion and the second engaging portion respectively extend into corresponding connection slots of the two adjacent secondary batteries and are respectively bonded with the corresponding connection slots.

* * * * *